(12) United States Patent
Khadri (10) Patent No.: US 7,907,713 B2
(45) Date of Patent: Mar. 15, 2011

(54) METHODS, SYSTEMS, AND COMPUTER PROGRAM PRODUCTS FOR USING A PRESENCE DATABASE TO DELIVER ENHANCED PRESENCE INFORMATION REGARDING COMMUNICATIONS MADE TO OR FROM A PRESENTITY

(75) Inventor: Seetharaman Khadri, Cary, NC (US)

(73) Assignee: Tekelec, Morrisville, NC (US)

( * ) Notice: Subject to any disclaimer, the term of this patent is extended or adjusted under 35 U.S.C. 154(b) by 360 days.

(21) Appl. No.: 11/586,423

(22) Filed: Oct. 25, 2006

(65) Prior Publication Data

US 2007/0127676 A1 Jun. 7, 2007

Related U.S. Application Data

(60) Provisional application No. 60/729,995, filed on Oct. 25, 2005.

(51) Int. Cl.
*H04M 3/42* (2006.01)
(52) U.S. Cl. ........... 379/201.01; 379/211.02; 379/207.01
(58) Field of Classification Search ............ 379/211.01–211.02, 265.01–265.14, 188, 199, 207.01, 379/201.01
See application file for complete search history.

(56) References Cited

U.S. PATENT DOCUMENTS

| | | | |
|---|---|---|---|
| 5,341,680 A | 8/1994 | Mains, Jr. | |
| 5,579,371 A | 11/1996 | Aridas et al. | |
| 5,610,969 A | 3/1997 | McHenry et al. | |
| 5,774,668 A | 6/1998 | Choquier et al. | |
| 5,812,639 A | 9/1998 | Bartholomew et al. | |
| 5,999,525 A | 12/1999 | Krishnaswamy et al. | |
| 6,091,957 A | 7/2000 | Larkins et al. | |
| 6,091,959 A | 7/2000 | Souissi et al. | |
| 6,094,573 A | 7/2000 | Heinonen et al. | |
| 6,115,754 A | 9/2000 | Landgren | |
| 6,119,014 A | 9/2000 | Alperovich et al. | |
| 6,122,510 A | 9/2000 | Granberg | |
| 6,128,304 A | 10/2000 | Gardell et al. | |
| 6,134,314 A | 10/2000 | Dougherty et al. | |
| 6,134,432 A | 10/2000 | Holmes et al. | |

(Continued)

FOREIGN PATENT DOCUMENTS

EP 1 269 764 B1 7/2008

(Continued)

OTHER PUBLICATIONS

Notification of Transmittal of the International Search Report and the Written Opinion of the International Searching Authority, or the Declaration for International Application No. PCT/US05/08258 (Aug. 16, 2006).

(Continued)

*Primary Examiner* — William J Deane
(74) *Attorney, Agent, or Firm* — Jenkins, Wilson, Taylor & Hunt, P.A.

(57) ABSTRACT

Methods, systems, and computer program products for using a presence database to deliver enhanced presence information regarding communications made to or from a presentity are disclosed. According to one aspect, a method may include obtaining enhanced presence information including information regarding parties involved in communications made to or from a presentity and storing the enhanced presence information in a presence database. A request may be received from a subscriber for obtaining the enhanced presence information regarding the presentity. In response to the request, the enhanced presence information may be delivered from the presence database to the subscriber.

54 Claims, 7 Drawing Sheets

U.S. PATENT DOCUMENTS

| | | | |
|---|---|---|---|
| 6,181,937 B1 | 1/2001 | Joensuu | |
| 6,215,790 B1 | 4/2001 | Voit et al. | |
| 6,219,551 B1 | 4/2001 | Hentilä et al. | |
| 6,252,952 B1 | 6/2001 | Kung et al. | |
| 6,301,609 B1 | 10/2001 | Aravamudan et al. | |
| 6,304,565 B1 | 10/2001 | Ramamurthy | |
| 6,324,183 B1 | 11/2001 | Miller et al. | |
| 6,333,931 B1 | 12/2001 | LaPier et al. | |
| 6,363,411 B1 | 3/2002 | Dugan et al. | |
| 6,373,930 B1 | 4/2002 | McConnell et al. | |
| 6,430,176 B1 | 8/2002 | Christie, IV | |
| 6,446,127 B1 | 9/2002 | Schuster et al. | |
| 6,453,034 B1 | 9/2002 | Donovan et al. | |
| 6,456,845 B1 | 9/2002 | Drum et al. | |
| 6,470,179 B1* | 10/2002 | Chow et al. | 455/406 |
| 6,515,997 B1 | 2/2003 | Feltner et al. | |
| 6,564,261 B1 | 5/2003 | Gudjonsson et al. | |
| 6,571,094 B1 | 5/2003 | Begeja et al. | |
| 6,611,516 B1 | 8/2003 | Pirkola et al. | |
| 6,639,981 B1 | 10/2003 | Dunn, Jr. et al. | |
| 6,718,178 B1 | 4/2004 | Sladek et al. | |
| 6,747,970 B1 | 6/2004 | Lamb et al. | |
| 6,760,343 B1 | 7/2004 | Krishnamurthy et al. | |
| 6,968,052 B2 | 11/2005 | Wullert, II | |
| 7,058,036 B1 | 6/2006 | Yu et al. | |
| 7,146,181 B2 | 12/2006 | Schaedler et al. | |
| 7,209,968 B1 | 4/2007 | Secer | |
| 7,260,207 B2 | 8/2007 | Marsico | |
| 7,701,925 B1 | 4/2010 | Mason et al. | |
| 2001/0031641 A1 | 10/2001 | Ung et al. | |
| 2001/0034224 A1 | 10/2001 | McDowell et al. | |
| 2002/0058507 A1 | 5/2002 | Valentine et al. | |
| 2002/0078209 A1 | 6/2002 | Peng | |
| 2002/0086672 A1 | 7/2002 | McDowell et al. | |
| 2002/0187781 A1 | 12/2002 | Furlong | |
| 2002/0193127 A1 | 12/2002 | Martschitsch | |
| 2003/0026289 A1 | 2/2003 | Mukherjee et al. | |
| 2003/0031160 A1 | 2/2003 | Gibson Ang et al. | |
| 2003/0073440 A1 | 4/2003 | Mukherjee et al. | |
| 2003/0100326 A1 | 5/2003 | Grube et al. | |
| 2003/0148779 A1 | 8/2003 | Aravamudan et al. | |
| 2003/0177281 A1 | 9/2003 | McQuillan et al. | |
| 2003/0235180 A1 | 12/2003 | Oprescu-Surcobe et al. | |
| 2004/0003037 A1 | 1/2004 | Fukimoto et al. | |
| 2004/0015569 A1* | 1/2004 | Lonnfors et al. | 709/220 |
| 2004/0047303 A1 | 3/2004 | Fernandez et al. | |
| 2004/0062383 A1* | 4/2004 | Sylvain | 379/265.06 |
| 2004/0125790 A1 | 7/2004 | Hiller et al. | |
| 2004/0153506 A1 | 8/2004 | Ito et al. | |
| 2004/0193686 A1 | 9/2004 | Blagsvedt et al. | |
| 2004/0203923 A1* | 10/2004 | Mullen | 455/456.1 |
| 2005/0027867 A1 | 2/2005 | Mueller et al. | |
| 2005/0050157 A1 | 3/2005 | Day | |
| 2005/0070310 A1 | 3/2005 | Caspi et al. | |
| 2005/0074101 A1 | 4/2005 | Moore et al. | |
| 2005/0091387 A1 | 4/2005 | Abe | |
| 2005/0136952 A1 | 6/2005 | Zabawskyj et al. | |
| 2005/0143111 A1 | 6/2005 | Fitzpatrick et al. | |
| 2005/0143135 A1 | 6/2005 | Brems et al. | |
| 2005/0164682 A1 | 7/2005 | Jenkins et al. | |
| 2005/0202836 A1 | 9/2005 | Schaedler et al. | |
| 2005/0228895 A1* | 10/2005 | Karunamurthy et al. | 709/229 |
| 2005/0266859 A1 | 12/2005 | Tejani et al. | |
| 2006/0112177 A1 | 5/2006 | Barkley et al. | |
| 2006/0140189 A1 | 6/2006 | Wu et al. | |
| 2006/0246880 A1 | 11/2006 | Baldwin et al. | |
| 2010/0017472 A1 | 1/2010 | Benedyk et al. | |
| 2010/0137002 A1 | 6/2010 | Agarwal et al. | |

FOREIGN PATENT DOCUMENTS

| | | |
|---|---|---|
| WO | WO 99/14910 | 3/1999 |
| WO | WO 00/35155 | 6/2000 |
| WO | WO 01/56308 | 8/2001 |
| WO | WO 01/72055 A2 | 9/2001 |
| WO | WO 2005/086966 A2 | 9/2005 |
| WO | WO 2005/086972 A2 | 9/2005 |
| WO | WO 2006/118755 A2 | 11/2006 |
| WO | WO 2007/050591 A2 | 5/2007 |

OTHER PUBLICATIONS

Notification of Transmittal of the International Search Report and the Written Opinion of the International Searching Authority, or Declaration (PCT/US05/08307, Mar. 13, 2006).

Campbell et al., "SIP Instant Message Sessions," p. 1 (Jun. 30, 2003).

Campbell et al., "Session Initiation Protocol (SIP) Extension for Instant Messaging," pp. 1-15 (Dec. 2002).

"3$^{rd}$ Generation Partnership Project; Technical Specification Group Services and Systems Aspects; Network Architecture (Release 5)," 3GPP TS 23.002, V5.7.0, p. 1-50, (Jun. 2002).

Commonly-assigned, co-pending U.S. Appl. No. 09/627,253 for "Presence Registration and Routing Node," (Unpublished, filed Jul. 28, 2000).

Sugano et al., "Presence Information Data Format for IMPP," Internet draft, draft-ietf-impp-pidf-01.txt, Network Working Group, p. 1-17, (Mar. 10, 2000).

Aggarwal et al., "Transport Protocol for Presence Information / Instant Messaging," Internet draft, draft-ietf-impp-pitp-mitp-01, Network Working Group, p. 1-21, (Mar. 9, 2000).

Day et al., "Instant Messaging/Presence Protocol Requirements," pp. 1-26 (Feb. 2000).

Day et al., "A Model for Presence and Instant Messaging," pp. 1-17 (Feb. 2000).

Stracke, "Message Information Data Format," Internet draft, draft-ietf-impp-midf-01.txt, Network Working Group, p. 1-4, (Jan. 19, 2000).

Tekelec, "IP Secure Gateway Release 1.0", Tekelec Release Documentation, 910-2046-01 Revision A (Nov. 1999).

Handley et al., "SIP: Session Initiation Protocol," Request for Comments: 2543, Network Working Group, p. 1-111, (Mar. 1999).

Handley et al., "SDP: Session Description Protocol," Request for Comments: 2327, Network Working Group, p. 1-42, (Apr. 1998).

Tekelec, "Feature Guide Eagle STP," P/N 910-1225-01 Revision B (Jan. 1998).

Tekelec, "Feature Guide LNP LSMS," P/N 910-1598-01 Revision A (Jan. 1998).

Final Official Action for U.S. Appl. No. 11/077,711 (Mar. 16, 2009).

Official Action for U.S. Appl. No. 11/120,324 (Jan. 21, 2009).

Notice of Abandonment for U.S. Appl. No. 09/627,253 (Nov. 12, 2008).

Non-Final Office Action for U.S. Appl. No. 11/077,711 (Jun. 26, 2008).

Decision to Grant a European Patent Pursuant to Article 97(1) EPC for European Patent No. 1269764 (Jun. 5, 2008).

Office Action for U.S. Appl. No. 11/120,324 (Apr. 16, 2008).

Final Official Action for U.S. Appl. No. 09/627,253 (Apr. 4, 2008).

Notification of Transmittal of the International Search Report and the Written Opinion of the International Searching Authority, or the Declaration for International Application No. PCT/US06/13404 (Oct. 5, 2007).

Official Action for U.S. Appl. No. 09/627,253 (Sep. 20, 2007).

Restriction/Election Requirement for U.S. Appl. No. 09/627,253 (Jun. 14, 2007).

Communication pursuant to Article 96(2) EPC corresponding to European application No. 01 920 654.9 dated May 2, 2007.

Notice of Panel Decision for U.S. Appl. No. 09/627,253 (Apr. 2, 2007).

Notice of Allowance and Fee(s) Due for U.S. Appl. No. 10/798,924 (Oct. 3, 2006).

Official Action for U.S. Appl. No. 09/627,253 (Aug. 25, 2006).

Official Action for U.S. Appl. No. 10/798,924 (Feb. 23, 2006).

Advisory Action for U.S. Appl. No. 09/627,253 (Dec. 28, 2005).

Final Official Action for U.S. Appl. No. 09/627,253 (Jun. 2, 2005).

Notification of Transmittal of the International Search Report and the Written Opinion of the International Searching Authority, or Declaration for International Application No. PCT/US05/08307 (Mar. 11, 2005).

Official Action for U.S. Appl. No. 09/627,253 (May 19, 2004).

Restriction/Election Requirement for U.S. Appl. No. 09/627,253 (Jan. 9, 2004).
Official Action for U.S. Appl. No. 09/627,253 (Apr. 28, 2003).
Interview Summary for U.S. Appl. No. 09/627,253 (Jan. 30, 2003).
Notification of Transmittal of the International Search Report and the Written Opinion of the International Searching Authority, or the Declaration for International Application No. PCT/US06/41451 (Jul. 7, 2008).
Ex parte Quayle for U.S. Appl. No. 09/627,253 (May 7, 2009).
Communication regarding the expiry of the time limit within which notice of opposition may be filed for European Application No. 01920654.9 dated May 7, 2009.
Notice of Allowance and Fee(s) Due for U.S. Appl. No. 09/627,253 (Jul. 24, 2009).
Commonly-assigned, co-pending U.S. Appl. No. 12/484,857 for "Methods, Systems, and Computer Readable Media for Providing Presence Data From Multiple Presence Information Providers," (Unpublished, filed Jun. 15, 2009).
Official Action for U.S. Appl. No. 11/120,324 (October 19, 2009).
Final Official Action for U.S. Appl. No. 11/077,711 (Jun. 23, 2010).
Final Official Action for U.S. Appl. No. 11/120,324 (Jun. 22, 2010).
Communication purusant to Article 94(3) EPC for European application No. 08153801.9 (May 28, 2010).
Commonly assigned, co-pending U.S. Divisional Patent Application for "Presence Registration and Routing Node," (Unpublished, filed Apr. 19, 2010).
Interview Summary for U.S. Appl. No. 11/120,324 (Mar. 11, 2010).
Interview Summary for U.S. Appl. No. 11/077,711 (Mar. 4, 2010).
European Search Report for European application No. 08153801.9 (Jan. 27, 2010).
Notification of Transmittal of the International Search Report and the Written Opinion of the International Searching Authority, or the Declaration of PCT/US2009/047391 (Jan. 25, 2010).
Official Action for U.S. Appl. No. 11/077,711 (Dec. 24, 2009).
Commonly-assigned, co-pending U.S. Appl. No. 12/624,974 for "Methods, Systems, and Computer Readable Media for Providing Geo-Location Proximity Updates to a Presence System," (Unpublished, filed Nov. 24, 2009).
Wideberg et al., "Deriving Traffic Data From a Cellular Network," World Congress on Intelligent Transport System and Services. World Congress on Intelligent Transport System and Services (13). No. 13. Londres, UK. Ertico. (2006).
Klyne, et al., "Common Presence and Instant Messaging (CPIM): Message," Network Working Group, RFC 3862, p. 1-23 (Aug. 2004).
Peterson, J., "Common Profile for Instant Messaging (CPIM)," Network Working Group, RFC 3860 (Aug. 2004).
Rosenberg et al., "SIP: Session Initiation Protocol," Network Working Group, FRC 3261 (Jun. 2002).
Saraswat et al., "The Presence Protocol," Internet-Draft, draft-saraswat-presenceprotocol-00.txt, p. 1-15 (Feb. 26, 1999).
Rosenberg et al., "SIP for Presence," IETF, draft-rosenberg-sip-pip-00.txt, p. 1-22 (Nov. 13, 1998).

* cited by examiner

METHODS, SYSTEMS, AND COMPUTER PROGRAM PRODUCTS FOR USING A PRESENCE DATABASE TO DELIVER ENHANCED PRESENCE INFORMATION REGARDING COMMUNICATIONS MADE TO OR FROM A PRESENTITY

RELATED APPLICATIONS

This application claims the benefit of U.S. Provisional Patent Application Ser. No. 60/729,995, filed Oct. 25, 2005; the disclosure of which is incorporated herein by reference in its entirety.

TECHNICAL FIELD

The subject matter described herein relates to methods, systems, and computer program products for providing presence services. More particularly, the subject matter described herein relates to methods, systems, and computer program products for using a presence database to deliver enhanced presence information regarding communications made to or from a presentity.

BACKGROUND

In telecommunications, presence information is information regarding an end user's or entity's connection to a network. Presence information can include an end user's location, connection status, directory address, etc. An end user's connection status can indicate the ability and willingness of an end user to communicate. Presence information may be stored by a presence server and delivered to authorized subscribers. Presence information has been applied to the Internet technology known as instant messaging (IM).

There are currently models for distributing and collecting presence information within the scope of an Internet protocol/data network environment. The ability to track the presence information of Internet users has been fairly well developed and widely published. However, as communication networking technology has continued to evolve at a rapid pace, so have the means by which end users or subscribers can communicate. More particularly, the explosive growth of handheld, wireless communication terminals, such as mobile phones, wireless web phones, and personal digital assistants, has led to a demand for inter-networking or inter-medium communication solutions. In other words, it is rapidly becoming useful for a subscriber to have his or her wireless phone status or "presence" known to other subscribers, where these other subscribers may be using a variety of communication mediums, such as wireless phone service, wired phone service, short message service (SMS), or Internet service. In one example, it would be desirable for a subscriber to be able to obtain information regarding communications, such as phone call communications, made to or from a subscribed-to entity, referred to as a presentity.

Presence service uses a subscription model where subscribers desiring to receive presence information regarding another subscriber (the presentity) subscribe to receive updates to the presentity's presence information with a presence server. After a successful subscription, the presence server automatically delivers updates in the presentity's presence information to subscribed entities, also referred to as watchers. However, conventional presence information that is delivered to watchers has been limited to the presentity's current communication status, e.g., whether the presentity is connected to the network and available to receive instant messages.

Current presence servers do not provide additional information, such as call logs, parties involved in calls, or whether a call to a presentity was completed. Such information may be useful, for example, if the presentity is a child and the watcher is a parent or guardian.

Accordingly, there exists a need for improved methods, systems, and computer program products for delivering enhanced presence information regarding communications made to or from a presentity.

SUMMARY

According to one aspect, the subject matter described herein includes a method for using a presence database to deliver enhanced presence information regarding communications made to or from a presentity. The method includes obtaining enhanced presence information including information regarding parties involved in communications made to or from a presentity and storing the enhanced presence information in a presence database. A request may be received from a subscriber for obtaining the enhanced presence information regarding the presentity. In response to the request, the enhanced presence information may be delivered from the presence database to the subscriber.

In some implementations, the request from the subscriber for obtaining the enhanced presence information may be a subscription request for subscribing to the presentity. Once the presence server or presence database receives such a subscription request, updates to the enhanced presence information may automatically be delivered to the subscriber. In another implementation, where the subscriber desires to obtain presence information on an on-demand basis, the request from the subscriber may be one time query for the enhanced presence information. In response to receiving such a query, a presence database or presence server may send the enhanced presence information. Updates may not be communicated to the subscriber in this case unless a subscriber later requests such updates or subscribes to the presentity.

According to another aspect, a method according to the subject matter described herein includes storing enhanced presence information including information regarding parties involved in communications made to or from a presentity. A request may be received from a subscriber for obtaining enhanced presence information regarding the presentity. The enhanced presence information can be delivered from the presence database to the subscriber in response to the request.

As used herein, the term "presentity" refers to a communications end user or entity for which presence information and/or enhanced presence information may be maintained. The term "presence information" refers to information regarding a presentity's connection status, such as whether the user is connected to a network and available to receive communications or not. The term "enhanced presence information" refers to information in addition to network connection status of a presentity, such as parities with which the presentity is or has communicated, a log of calls or other modes of communications involving the presentity, and indications as to whether the calls or other modes of communications were successful.

Enhanced presence information may be stored in a presence database and obtained by authorized subscribers. In accordance with the subject matter described herein, a presence database may be used for storing any enhanced presence information, such as call-related information identifying a party with whom the presentity has or is communicating, information regarding a duration of a call with a party with whom the presentity has or is communicating, information regarding re-direction of a call involving the presentity, and information regarding forwarding of a call involving the presentity. A presence server may manage presence information for a plurality of presentities, subscriptions to the presentities, and privacy restrictions of each presentity.

In one example of enhanced presence information, a call log may be generated and maintained by a presence server. The call log may include any information identifying parties to calls, such as a mobile subscriber identifier (e.g., a mobile subscriber ISDN number (MSISDN), an international mobile subscriber identifier (IMSI), and a mobile identification number (MIN)), a wireline telephone number, a session initiation protocol (SIP) URI, a web chat screen name or alias, an instant message identifier, or an IP address of either or both parties to a call, and a communication date/time stamp. Enhanced presence information that is collected may also include call disposition type information, such as an indication of whether the call was answered, call duration, an indication of whether the call was re-directed or forwarded, and an indication of the address to which the call was re-directed.

The subject matter described herein can be implemented as a computer program product comprising computer executable instructions embodied in a computer readable medium. Exemplary computer readable media suitable for implementing the subject matter described herein include disk memory devices, chip memory devices, application specific integrated circuits, programmable logic devices, and downloadable electrical signals. In addition, a computer program product that implements the subject matter described herein may be located on a single device or computing platform. Alternatively, the subject matter described herein can be implemented on a computer program product that is distributed across multiple devices or computing platforms.

BRIEF DESCRIPTION OF THE DRAWINGS

Exemplary embodiments of the subject matter will now be explained with reference to the accompanying drawings, of which.

DETAILED DESCRIPTION

Figure 1:
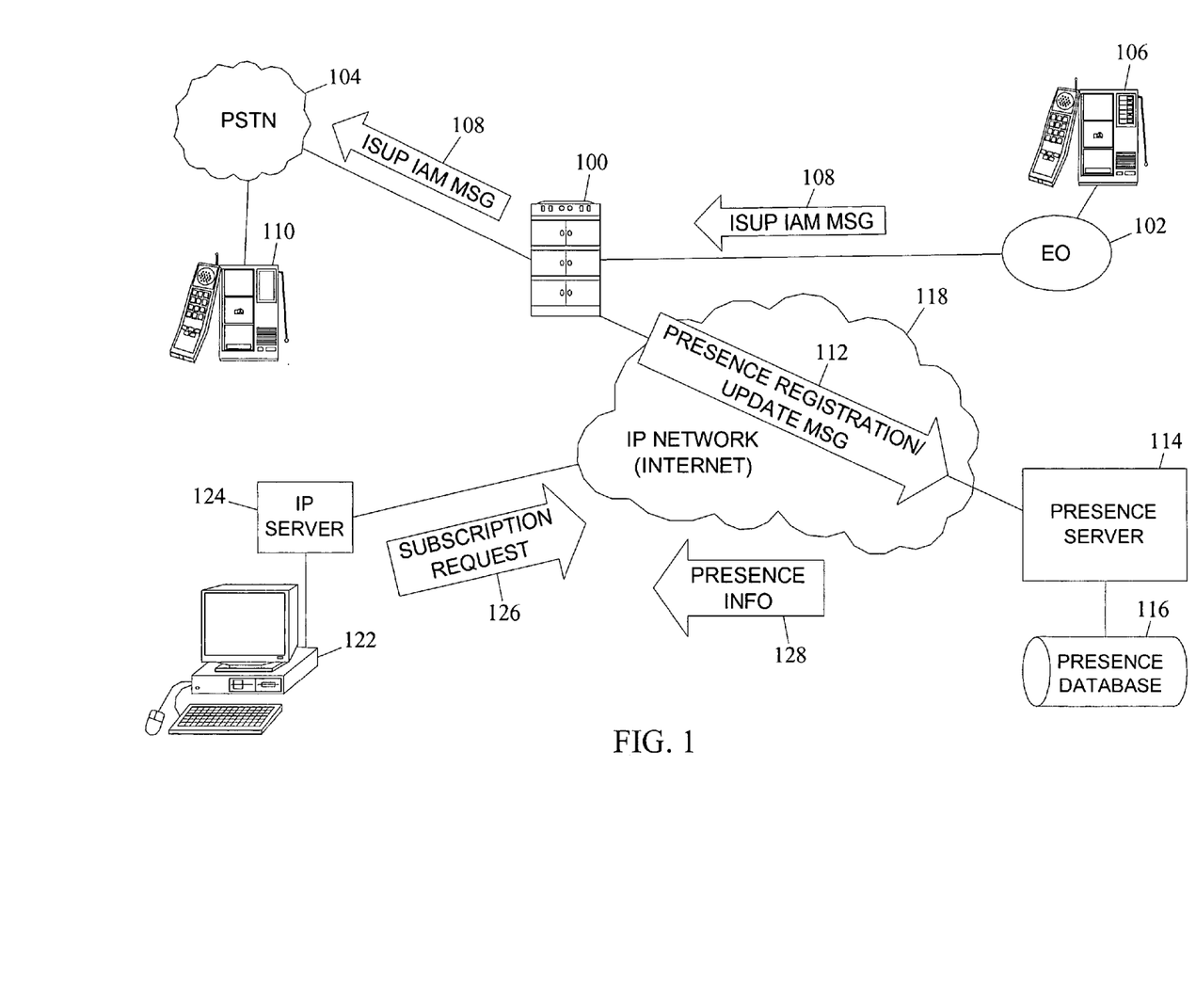
FIG. 1 is a block diagram of an example of a telecommunications system for using a presence database to deliver enhanced presence information regarding communications made to or from a presentity according to an embodiment of the subject matter described herein.

A telecommunications system for using a presence database to deliver enhanced presence information regarding communications made to or from a presentity may be implemented as hardware, software, and/or firmware components executing on one or more components of a network. FIG. 1 illustrates an example of a telecommunications system for using a presence database to deliver enhanced presence information regarding communications made to or from a presentity according to an embodiment of the subject matter described herein. Referring to FIG. 1, the system may include a signaling network node 100 operable to communicate or route signaling messages between an end office (EO) 102 and a public switched telephone network (PSTN) 104. For example, network node 100 may be a signaling system 7 (SS7)/Internet protocol (IP) routing node. Network node 100 may be operable to obtain enhanced presence information regarding parties involved in communications made to or from a presentity and send the information to a presence database for storage. The information stored in the presence database may be made available to authorized subscribers who subscribe to the presentity. For example, the subscribers may be the parents or guardians of the presentity, and the enhanced presence information may include a call log of calls involving the presentity via one or more communications devices used by the presentity. Table 1 shown below illustrates exemplary enhanced presence information that may be called for and delivered to watchers of a presentity.

TABLE 1

| | Enhanced Presence Information | | | |
|---|---|---|---|---|
| Called Directory Number (DN) | Calling DN | Caller ID Information | Call Completed? | Timers |
| 9193803814 | 9194938000 | Greg Jones | Y | 0900-0910, Oct. 6, 2006 |
| 9193803814 | 8188807919 | Ron Smith | Y | 1000-1010, Oct. 6, 2006 |
| 3803814@Tekelec.com | 8665199000 | Henry Jackson | Y | 1100-1110, Oct. 6, 2006 |
| 9198188800 | 9193803814 | Not available | Y | 1200-1210, Oct. 6, 2006 |

In Table 1, the enhanced presence information that may be collected includes called party directory number information, calling party directory number information, caller ID information, if available, call completion information, and time information associated with each call. In the illustrated example, it is assumed that the presentity has two identities, 9193803814 and 3803814@Tekelec.com, depending whether the presentity is using a landline phone or a web phone. In the first three entries in the table, the presentity is being called by other entities. In the last entry in the table, the presentity is calling another party. If caller ID information is available, the network node 100 or presence server 114 may collect this information, for example, by querying a CNAM database. In addition, call completion and duration information may be obtained based on call signaling messages, such as ISUP messages or SIP messages associated with the call. Methods for obtaining the enhanced presence information based on call signaling information associated with a call be described in more detail below.

Figure 2:
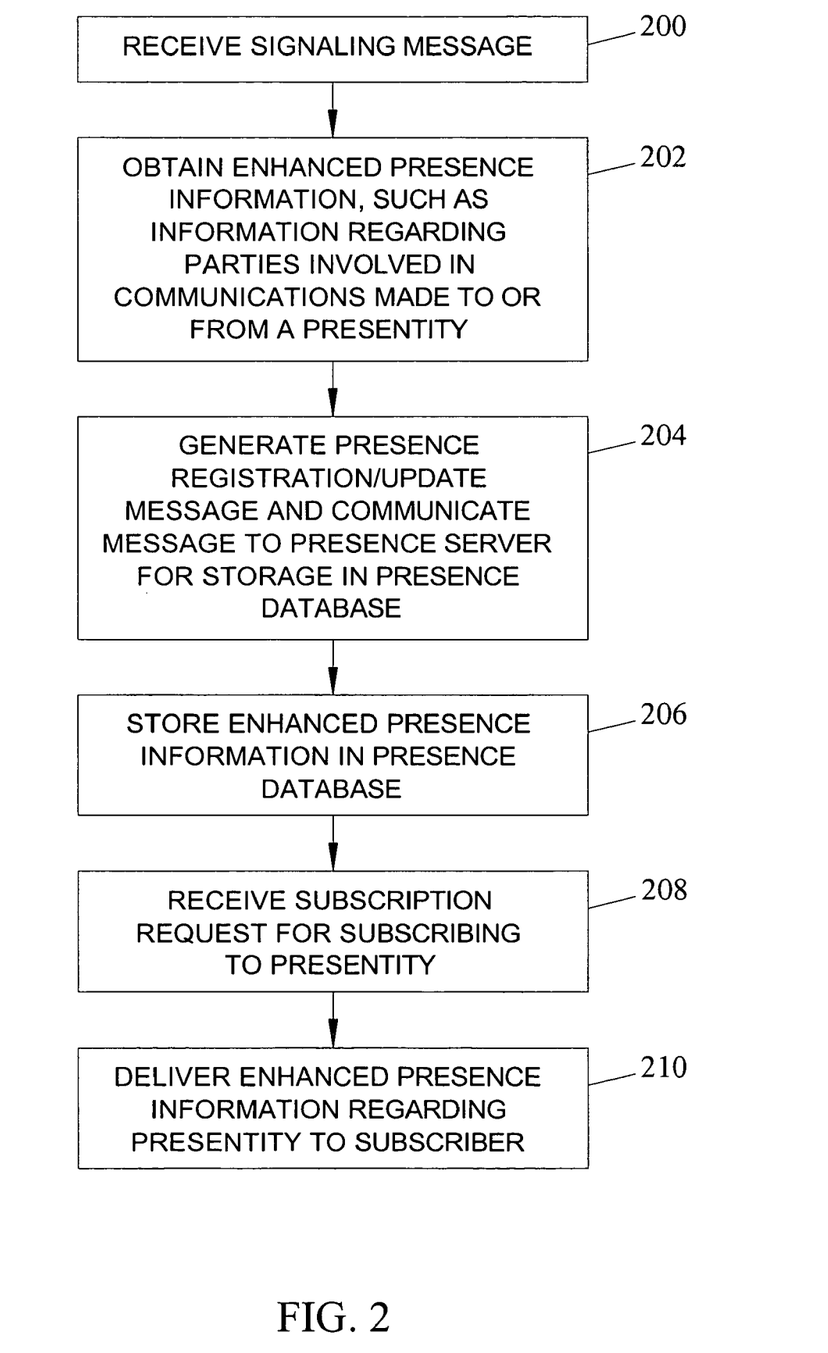
FIG. 2 is a flow chart of an exemplary process for using a presence database to deliver enhanced presence information regarding communications made to or from a presentity according to an embodiment of the subject matter described herein.

FIG. 2 is a flow chart illustrating an exemplary process for using a presence database to obtain and deliver enhanced presence information regarding communications made to or from a presentity according to an embodiment of the subject matter described herein. The flow chart in FIG. 2 will be used in combination with the signaling messages in FIG. 1 to illustrate the obtaining and delivering of enhanced presence information. In this example, it is assumed that the presentity is initiating a phone call from a wireline phone 106. Wireline phone 106 may be connected to end office 102. Network node 100 may receive an SS7 ISDN user part (ISUP) IAM signaling message 108 from end office 102 (block 200). Those skilled in the art of SS7 signaling will appreciate that an ISUP IAM signaling message is the first in a sequence of ISUP formatted SS7 call control signaling messages that are required to complete a phone call in the PSTN. In this example, IAM signaling message 108 is generated by end office 102 in response to initiation of the phone call from phone 106. Message 108 is communicated to network node 100 for establishing a call with a wireline phone 110 connected to PSTN 104. Message 108 may include calling and called party identifier information. For example, the calling and called party identifiers may be numbers associated with phones 106 and 110, respectively.

In block 202, network node 100 may obtain enhanced presence information, such as regarding parties involved in communications made to or from a presentity (block 202). In one example, network node 100 may be operable to determine that the calling party number in message 108 is associated with the presentity. For example, network node 100 may store a list of numbers associated with presentities. Thus, based on the calling party identifier information, network node 100 can determine that IAM signaling message 108 is associated with a communication made to or from the presentity. In another example, network node 100 may determine that the message is an IAM signaling message for setting up a call, and may extract the called and calling party identifier information from the message in response to the determination. Network node 100 may also associate a date/time stamp with the called and/or calling party identifier information for identifying the date and time of the call.

In block 204, network node 100 may generate presence registration or update message 112 including the enhanced presence information, such as the called and/or calling party identifier information and associated date/time stamp and communicate message 112 to a presence server 114 for storage in presence database 116. Message 112 may be a SIP message communicated via IP network 118. Presence server 114 may receive message 112 and store the enhanced presence information, such as the called and/or calling party identifier information and associated date/time stamp, in presence database 116 (block 206). In one example, the party identifier information and date/time stamp may be stored in presence database 116 in a call log entry for the presentity. On receiving enhanced presence information in a registration message, presence server 114 may generate a new call log entry for the presentity. Alternatively, on receiving presentity information in an update message, presence server 112 may update an existing entry for the presentity in a call log.

Other enhanced presence information that may be stored in presence server 114 includes information regarding re-direction of a call involving the presentity and information regarding forwarding of a call involving the presentity. Those skilled in the art of network signaling will appreciate that one or more signaling messages may be examined to determine the re-direction or forwarding of a call. For example, an ISUP IAM or SIP re-INVITE message may include call redirection or forwarding information that may be collected by network node 100 and delivered to presence server 114. Network node 100 may be operable to determine the re-direction or forwarding of a call associated with a presentity. In response to determining the call re-direction or the call forwarding, network node 100 may generate a presence or update message indicating call re-direction or call forwarding associated with a presentity's phone number and communicate the message to presentity server 114 for storage of the information in presence database 116.

In block 208, presence server 114 may receive a subscription request from a subscriber for subscribing to the presentity. For example, a subscriber may input information into a computer 122 for requesting presence information associated with the presentity. Computer 122 may generate a message identifying the presentity and communicate the message to an IP server 124 for obtaining the presence information associated with the presentity. In response to receiving the message, IP server 124 may generate a SIP subscribe message 126 for the subscriber for subscribing to the presentity. Presence server 114 may receive SIP subscribe message 126 identifying presentity. Presentity may be identified in message 126 by a party identifier, such as a phone number. Other suitable SIP-type messages or other suitable protocols may be used to convey the subscription request.

In response to receiving SIP subscribe message 126, and successful authentication of the subscriber, presence server 114 may retrieve enhanced presence information for the presentity identified in the message and deliver the enhanced presence information to the subscriber (block 210). For example, presence server 114 may retrieve the enhanced presence information from presence database 116. Further, presence server 114 may generate a SIP notify message 128 including the enhanced presence information and communicate the message to IP server 124. In one example, the enhanced presence information may be stored in an XML-encoded format within the SIP notify message for conveying the presence information. IP server 124 may communicate the presence information to computer 122 associated with the subscriber. Computer 122 may present or display the enhanced presence information to the subscriber. The subject matter described herein may provide for the real-time or near real-time observation of the communication activity of a presentity. In one example, a parent subscriber may obtain enhanced presence information associated with a child. Other suitable SIP-type messages or other suitable protocols may be used to convey the enhanced presence information.

In one embodiment, enhanced presence information updates are automatically communicated to a subscriber who successfully subscribes to a presentity. For example, when presence server 114 receives updated enhanced presence information, presence server 114 may automatically communicate the updated enhanced presence information to the subscriber at computer 122. The updated enhanced presence information can be sent in response to changes to information previously sent to the subscriber.

Figure 3:
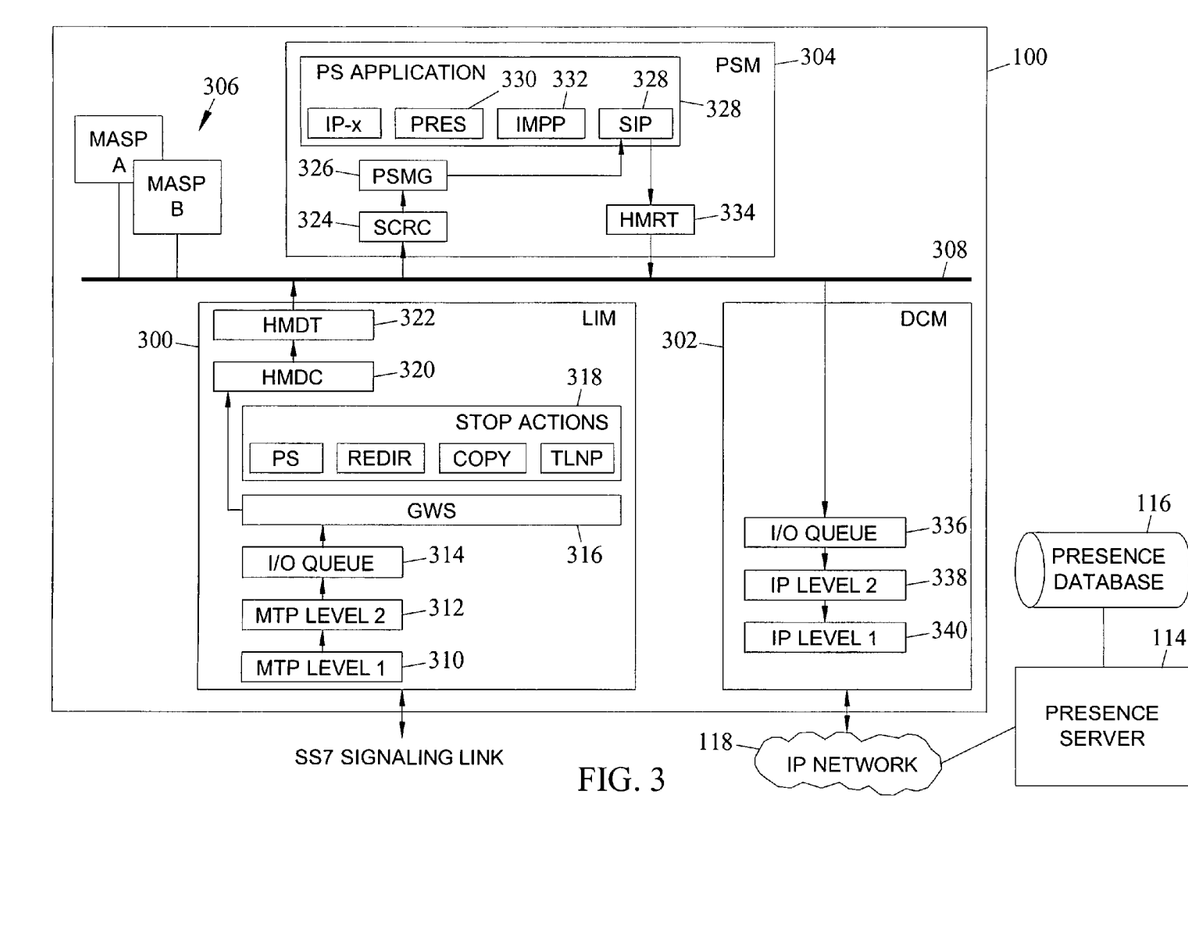
FIG. 3 is a block diagram of exemplary internal architectures of a network node and a presence server according to an embodiment of the subject matter described herein.

FIG. 3 is a block diagram illustrating exemplary internal architectures of network node 100 and presence server 112 according to an embodiment of the subject matter described herein. In this example, network node 100 is an SS7/IP routing node, which may include SS7 signal transfer point (STP) functionality, SS7/IP gateway functionality, and/or IP routing functionality. Referring to FIG. 3, network node 100 includes a plurality of internal processing modules or cards 300, 302, 304, and a pair of maintenance and administration subsystem processors (MASPs) 306 connected to each other via a high speed interprocessor message transport (IMT) bus 308. Processing modules 300, 302, 304, and 306 may each include an application processor and associated memory for implementing a telecommunications signaling function. In addition, each processing module may include a communications processor for communicating with other processing modules via bus 308.

MASP pair 306 implements maintenance and administration subsystem functions. As MASP pair 306 are not particularly relevant to a discussion of presence processing according to the subject matter described herein, a detailed discussion of their function is not provided herein.

Processing module 300 comprises a link interface module (LIM) for interfacing with SS7 signaling links. LIM 300 may include an SS7 MTP level 1 function 310, an SS7 MTP level 2 function 312, an I/O buffer or queue 314, a gateway screening (GWS) function 316, a presence service request (PSR) stop action function 318, an SS7 MTP level 3 message handling and discrimination (HMDC) function 320, and a message handling and distribution (HMDT) function 322. MTP level 1 and 2 functions 310 and 312, respectively, provide the facilities for sending and receiving digital data over a particular physical media/physical interface, as well as to provide error detection/correction and sequenced delivery of all SS7 messages. I/O queue 314 provides for temporary buffering of incoming and outgoing signaling messages. GWS function 316 is responsible for examining the incoming signaling messages and determining which, if any, of the provisioned stop actions are applicable. PSR stop action function 318 is responsible for examining received messages and determining whether the messages are associated with a presentity. In response to determining that a received message is associated with a presentity, PSR stop action function 318 may generate a copy of the message, and subsequently encapsulate the message within an SS7 signaling connection control part (SCCP) formatted message. It should be appreciated that PSR stop action function 318 can also be configured to encapsulate the original incoming signaling message, without making a copy. HMDC 320 receives signaling messages from the lower processing layers and performs a discrimination function, effectively determining whether an incoming SS7 message requires internal processing or is simply to be through switched. For instance, in the case of an SS7 signaling message associated with a call involving a presentity or an SCCP encapsulated ISUP IAM message, HMDC 320 would determine that the message should be internally routed for further processing. HMDT 322 manages or directs the internal routing of SS7 messages that require additional processing prior to final routing. It should be appreciated that a LIM card may contain more functional processes than those described above.

In one example, PSR stop action function 318 may determine whether a received ISUP IAM signaling message includes information regarding parties involved in communications made to or from a presentity. In one example, PSR stop action function 318 may examine the identifier information in the source address and the destination address of the message for determining whether the message is being sent to or received from a presentity. If it is determined that the message is associated with a presentity, copy function 323 may copy and encapsulate the message, and forward the message copy to module 304 for further processing. Messages that are not associated with a presentity may be forwarded to other modules of network node 100 for processing prior to final routing.

Module 304 comprises a presence service module (PSM) including a database and database control processes for generating presence registration/update messages and for routing the messages to a presence database. In the illustrated example, module 304 includes an SCCP subsystem controller known as a signaling connection routing controller (SCRC) process 324, a presence service manager (PSMG) 326, and a number of presence server functions. Included among the presence server functions is a SIP registration/update function 328, for generating SIP messages, forwarding the SIP messages to presence server 112, and processing SIP messages received from presence server 112. The format for SIP messages is described in detail in RFC 2543, "SIP: Session Initiation Protocol" (March 1999), the disclosure of which is incorporated herein by reference in its entirety.

Presence protocol function 330 may also be included for communicating with a presence server. For example, function 330 may communicate with a presence server using the messages described in accordance with the proposed presence protocol found in "The Presence Protocol," internet-draft-saraswat-presenceprotocol-00.txt, Feb. 26, 1999, the disclosure of which is incorporated herein by reference in its entirety.

Instant messaging and presence protocol (IMPP) function 332 may also be included for communicating with a presence server according to the IMPP protocol. The IMPP protocol is described in detail in one or more of the following IETF Internet draft documents:

"Message Information Data Format,"<draft-ieff-impp-midf-01.txt>, Jan. 19, 2000;

"Presence Information Data Format for IMPP,"<draft-ieff-impp-pidf-01.txt>, Mar. 10, 2000; and "Transport Protocol for Presence Information/Instant Messaging,"<draft-ieff-impp-pitp-mitp-01.txt>, Mar. 9, 2000, the disclosures of each of which are incorporated herein by reference in their entireties.

The subject matter described herein is not limited to communicating with a presence server using SIP, IMPP, or presence protocols. Any suitable protocol for communicating with a presence server is within the scope of the subject matter described herein.

SCRC function 324 is responsible for discrimination of signaling messages at the SCCP level and for distributing the signaling messages to an appropriate higher processing level application or function. In the configuration shown in FIG. 3, the next highest processing level is represented by PSMG 326. PSMG 326 is responsible for determining how to process the incoming message. For example, if the message contains an SCCP-encapsulated ISUP IAM message, PSMG 326 may extract enhanced presence information involving a presentity. As will be appreciated from FIG. 3, a number of presence services functions may be simultaneously provisioned on a single PSM card. These presence server functions may be configured such that each function is capable of generating presence registration/update messages that are formatted in different protocols including, but not limited to, SIP, IMPP, and presence protocol.

While any of the above-described presence registration applications may be provisioned on a single PSM card, SIP registration/update application function 328 is used in the examples described herein to illustrate the functionality of the node in registering or updating presence information in a presence database. SIP registration/update application function 328 essentially contains the logic necessary to process the incoming SS7 message and construct the appropriate SIP-formatted presence registration/update message including information regarding parties involved in communications made to or from a presentity. The messages generated by SIP registration/update application function 328 may be forwarded to DCM 302. An HMRT process 334 may receive the messages generated by function 328 and determine to which DCM card the messages should be routed for subsequent outbound transmission. In this case, the HMRT function 334 determines that the desired outbound signaling link associated with the routing of the message is located on DCM 302.

DCM 302 may receive messages from process 328 for out-bound communication to presence server 114 via IP network 118. DCM 302 includes an I/O queue 334 and IP level 1 and 2 processes 336 and 338, respectively. I/O queue 334 facilitates temporary buffering of incoming and outgoing signaling messages, while IP addressing operations are performed by IP level 1 and 2 processes 336 and 338. The messages may be communicated to presence server 114, which may store presence information in presence database 116.

Figure 4A:
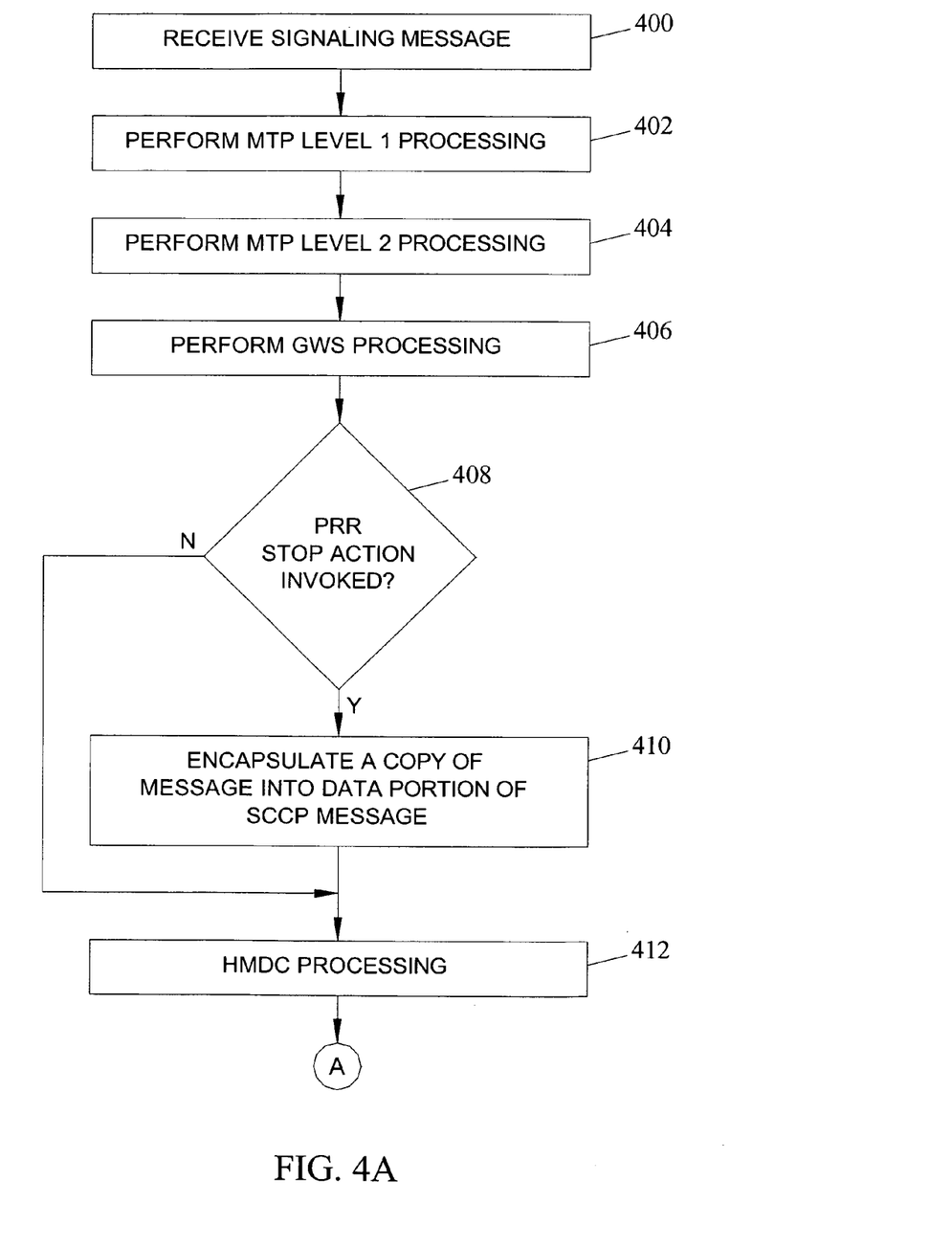
FIGS. 4A and 4B are a flow chart of an exemplary process for using the network node shown in FIG. 3 for providing enhanced presence information to a presence server database in accordance with an embodiment of the subject matter described herein.
Figure 4B:
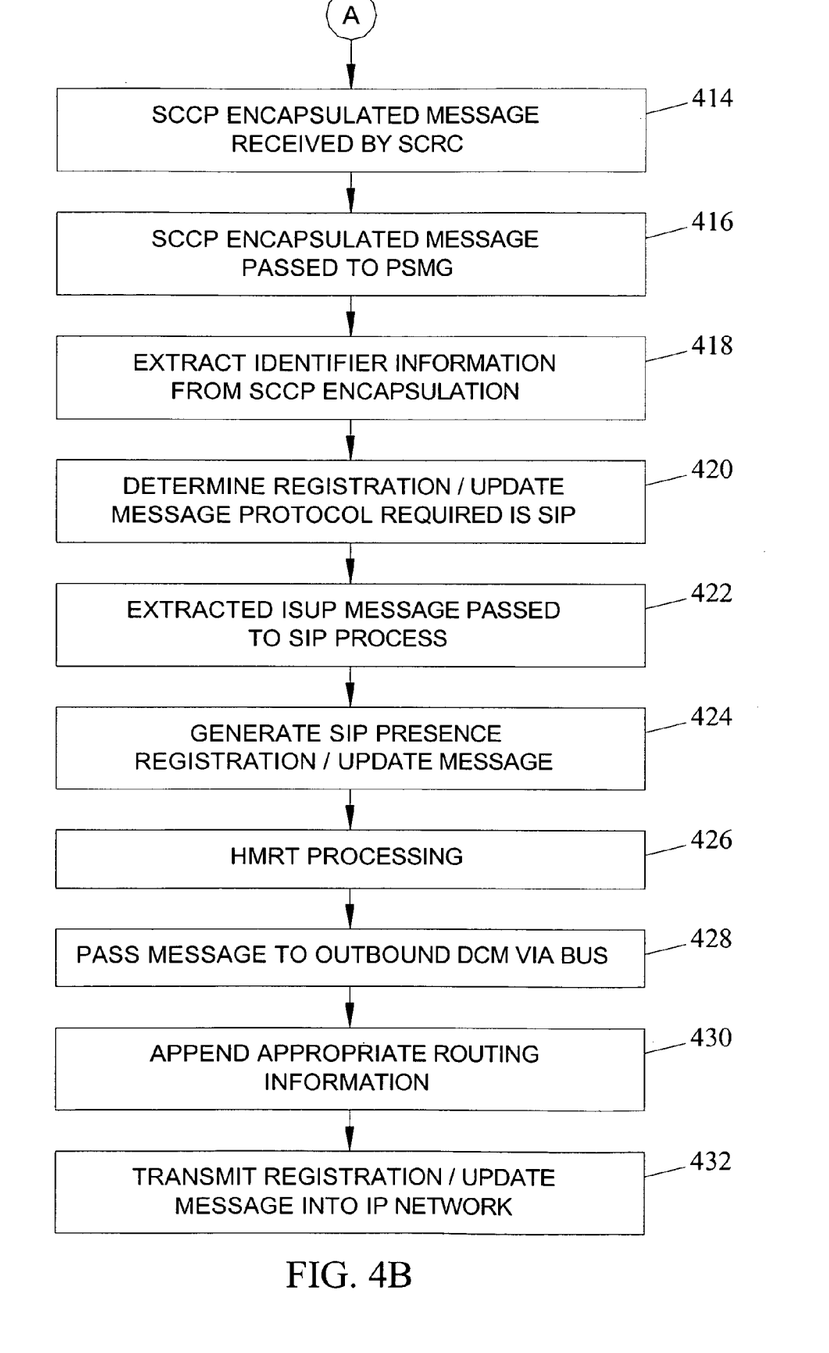

FIGS. 4A and 4B are a flow chart illustrating an exemplary process for using network node 100 shown in FIG. 3 for providing enhanced presence information to a presence server database in accordance with an embodiment of the subject matter described herein. Referring to FIG. 4A, in block 400, an incoming ISUP IAM signaling message is received at inbound LIM 300. In blocks 402 and 404, the incoming ISUP IAM signaling message is received and processed by MTP level 1 and 2 functions 310 and 312, respectively. With MTP level 1 and 2 processing complete, the signaling message is temporarily buffered in I/O queue 314 before being passed up to GWS function 316. As indicated in block 406, GWS function 316 examines the incoming ISUP IAM signaling message and determines not only whether the message is to be allowed into the node for further processing, but also which, if any, of the provisioned stop actions are applicable to the incoming message. In this example, GWS function 316 examines the incoming ISUP IAM signaling message and determines that the message is permitted to enter the node. Further, upon examination of the originating point code (OPC), destination point code (DPC), and service indicator octet (SIO) fields contained in the MTP routing layer, it is determined that the message requires additional processing by PSR stop action function 318 (block 408).

In block 410, PSR stop action function 318 receives the ISUP IAM signaling message from GWS function 316 and determines that the incoming message is an ISUP IAM type message. PSR stop action function 318 next checks the DPC of the incoming message to verify that the DPC of the incoming message is a valid PC. PSR stop action function 318 examines the identifier information in the source address and the destination address of the message for determining whether the message is involved in communications made to or from a presentity. If the incoming message is identified as being involved in communications made to or from a presentity, process 318 encapsulates a copy of the ISUP IAM message within an SCCP formatted message, as indicated in block 410. Such SCCP encapsulation is effectively achieved by adding essential SCCP message leading and trailing bit sequences to the base bit sequence that comprises the ISUP IAM message. Thus, an SCCP type encapsulated message is created which envelops or contains an ISUP type message. Subsequent to this encapsulation, the incoming message no longer appears or is treated as an ISUP IAM message within node 100, but is instead processed internally as an SCCP type SS7 message.

Unless additional processing by an unrelated subsystem is required, the original ISUP IAM message is then routed to HMDC 320 where normal ISUP message type routing is resumed. However, once again, it should be appreciated that the original ISUP IAM message could be SCCP encapsulated and further processed instead of producing a copy of the ISUP message. It should also be appreciated that failure of the incoming ISUP message to meet the criteria specified for causing the original, non-encapsulated message to routed directly to HMDC 320 where normal ISUP message type to be routed directly to HMDC 320 where normal ISUP message type routing is resumed.

However, in the case where an incoming ISUP message satisfies block 408 criteria, SCCP encapsulation of the ISUP message occurs and the resulting encapsulated message is directed to HMDC 320 (block 412), where SCCP type processing is performed. In the example shown in FIG. 3, HMDC 320 examines the message and determines that the DPC and subsystem number (SSN) of the SCCP message correspond to a point code and subsystem of node 100. Consequently, further processing of the SCCP message within node 100 is assumed to be necessary, and the message is passed to HMDT 322. HMDT 322 examines the service indicator (SI) field of the encapsulated message, which indicates that the encapsulated message is an SCCP type. As such, HMDT 322 places the encapsulated SCCP message on bus 308 for transport to PSM 304 and subsequent presence registration/update service.

Referring to FIG. 4B, in block 414, the encapsulated SCCP message is received and examined by SCRC 324 that is resident on PSM 304. SCRC 324 examines the message, determines that presence registration/update service is indicated, and forwards the encapsulated message to PSMG function 326 (block 416). In block 418, PSMG function 326 extracts the identifier information in the source address and the destination address of the SCCP envelope and determines that the ISUP message requires the generation of a SIP-formatted presence registration message (block 420). The ISUP IAM message is subsequently directed to SIP process 328 for further processing (block 422). SIP process 328 examines the ISUP IAM message and, using information contained within the message, generates a SIP-formatted presence registration/update message (block 424). The SIP-formatted presence registration/update message may include call-related presence information for the presentity, such as the identifier information in the source address and the destination address.

With SIP-processing complete, the SIP-formatted presence registration/update message is passed to HMRT function 334. HMRT function 334 determines to which DCM card the messages should be routed for subsequent outbound transmission (block 426). In this case, the HMRT function 334 determines that the desired outbound signaling link associated with the routing of the message is located on DCM 302.

Consequently, the SIP message is internally routed across bus 308 to DCM 302, where it is generally received by an I/O queue 336 (block 428). Eventually, the message is passed from I/O queue 336 on to IP level 2 and level 1 functions 338 and 340, respectively (block 430). IP level 1 and 2 functions 340 and 338, respectively, provide the facilities necessary to send and receive digital data over a particular physical media/physical interface, as well as to provide error detection/correction and sequenced delivery of all IP messages transmitted in IP network 118. As indicated in block 432, the SIP-formatted presence registration/update message is then transmitted into IP network 118 for ultimate delivery to and use by presence server 114 and presence database 116.

Figure 5:
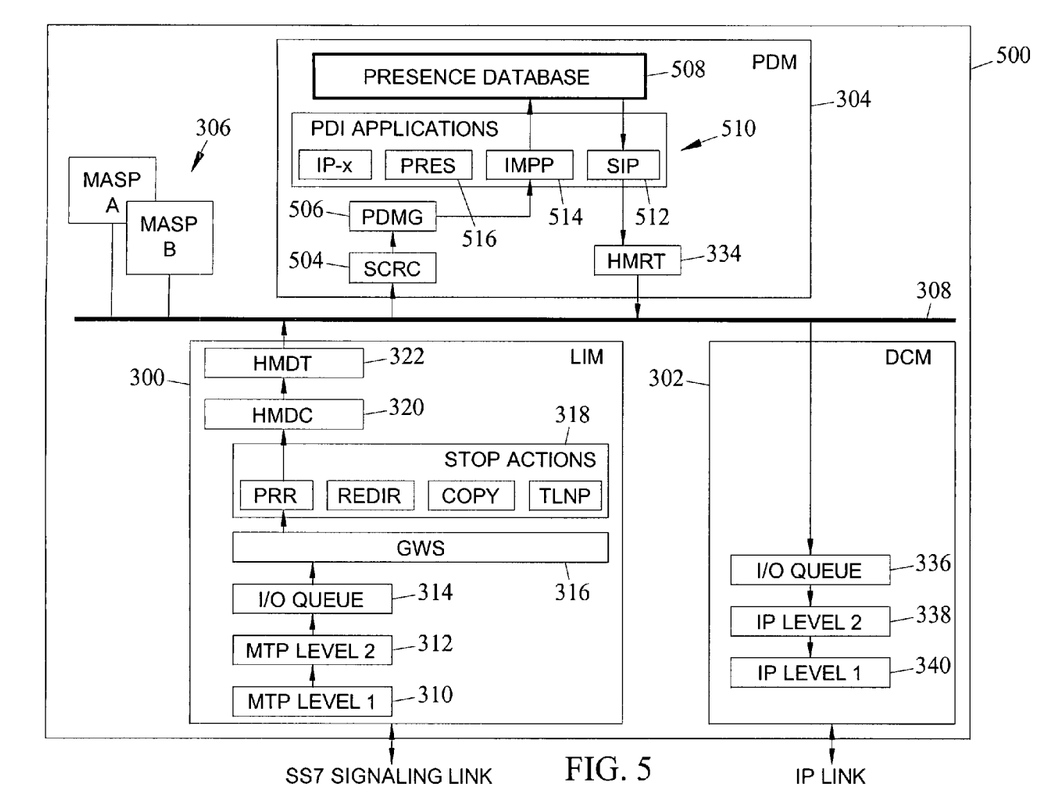
FIG. 5 is a block diagram of an exemplary internal architecture of a network node having a resident presence database system for storing enhanced presence information according to an embodiment of the subject matter described herein.

According to one embodiment, a presence database system may be resident on a network node. FIG. 5 is a block diagram illustrating an exemplary internal architecture of a network node 500 having a resident presence database system according to an embodiment of the subject matter described herein. In this example, presence registration/update messages are not formulated and routed from the node, but instead presence registration/updating takes place at or within the node. That is, in the embodiment shown in FIG. 5 and generally discussed below, the functionality of a presence server and presence database is generally included within node 500.

With particular regard to the embodiment shown in FIG. 5 and in a manner similar to the embodiment described above, it will be appreciated that node 500 includes IMT communications bus 308. Communicatively coupled to IMT bus 308 are a number of distributed processing modules or cards including: MASPs 306, an SS7 capable LIM 300, an IP capable DCM 302, and a presence database module (PDM) 502. These modules may be physically connected to IMT bus 308 such that signaling and other type messages may be routed internally between all active cards or modules. For simplicity of illustration, only a single LIM 300, DCM 302, and PDM 502 are included in FIG. 5. However, it should be appreciated that the distributed, multi-processor architecture of node 500 facilitates the deployment of multiple LIM, DCM, PDM, and other cards, all of which could be simultaneously connected to IMT bus 308. As in the previously described embodiment, MASP pair 306 implements the overall maintenance and administration subsystem functions.

In one exemplary implementation, node 500 may include SS7 and IP routing functionality as well as SS7/IP gateway functionality. For example, node 500 may be an SS7 signal transfer point, an SS7/IP gateway, and an IP router, all in a single node. In an alternate implementation, node 500 may be a stand-alone server that derives enhanced presence information from signaling messages copied from an external source, such as a network monitoring platform, stores the enhanced presence information, and delivers the presence information to subscribers. An exemplary hardware platform suitable for implementing node 500 is the TEKSERVER® Platform available from Tekelec of Morrisville, N.C.

In the illustrated example, LIM 300 includes a number of sub-component processes including SS7 MTP level 1 function 310, MTP level 2 function 312, I/O buffer or queue 314, GWS function 316, SS7 MTP level 3 layer HMDC process 320, and HMDT process 322. MTP level 1 and 2 function 310 and 312, respectively, provide the facilities necessary to send and receive digital data over a particular physical media/physical interface, as well as to provide error detection/correction and sequenced delivery of all SS7 messages. I/O queue 314 provides for temporary buffering of incoming and outgoing signaling messages. GWS function 316 is responsible for examining the incoming signaling messages and determining which, if any, of the provisioned stop actions are applicable. PSR stop action function 318 is responsible for examining received messages and determining whether the messages are associated with a presentity. In response to determining that a received message is associated with a presentity, PSR stop action function 318 may generate a copy of the message and subsequently encapsulate the message within an SS7 signaling connection control part (SCCP) formatted message. It should be appreciated that PSR stop action function 318 could also be configured to simply encapsulate the original incoming signaling message, without making a copy. HMDC function 320 receives signaling messages from the lower processing layers and performs a discrimination function, effectively determining whether an incoming SS7 message requires internal processing or is simply to be through switched. For instance, in the case of an SS7 signaling message associated with a call involving a presentity or an SCCP encapsulated ISUP IAM message, HMDC function 320 would determine that the message should be internally routed for further processing. HMDT function 322 manages or directs the internal routing of SS7 messages that require additional processing prior to final routing. It should be appreciated that a LIM card may contain more functional processes than those described above. The above discussion is limited to LIM functionality associated with the basic processing of in-bound signaling messages.

In general, a PDM card includes the database and database control processes necessary to facilitate the presence registration and query handling functionality of the contemplated embodiment of the subject matter described herein. PDM 502 shown in FIG. 5 includes, in part, an SCRC function 504, a presence database manager (PDMG) process 506, and a number of presence database interface (PDI) functions generally designated by reference numeral 510. Included among PDI functions 510 are a SIP function 512, an IMPP application process 514, and a presence protocol function 516. SCRC function 504 is responsible for discrimination of signaling messages and subsequent distribution of these signaling messages to an appropriate higher processing level application or function. In the configuration shown in FIG. 5, the next highest processing level is represented by PDMG function 506. PDMG function 506 may extract enhanced presence information, such as calling and called party identifier information, from the received message, and store the presence information for a presentity in a resident presence database 508.

Node 500 may receive presence registration or query messages formatted in different protocols including SIP, IMPP, and the presence protocol. These messages may be received by any inbound card of node 500 and communicated to PDM 502. PDMG function 506 is generally responsible for determining which of the provisioned protocol-specific PDI functions 510 is required to process the incoming presence registration or query message. For instance, if the incoming presence registration message contained an SCCP-encapsulated IMPP message, PDMG function 506 would determine that the provisioned PDI function 514 was required for successful provisioning. As will be appreciated from FIG. 5, a number of PDI functions 510 may be simultaneously provisioned on a single PDMG card. These protocol-specific PDI functions may be configured such that each function is capable of receiving presence registration or query messages that are formatted in different protocols including, but not limited to SIP, IMPP, and the presence protocol. Furthermore, these PDI functions 510 are also capable of generating or formatting protocol-specific presence service related response messages. Such a presence service response message may include a message that provides enhanced presence information for a presentity in response to a presence status query.

Once again, while any number or variety of PDI applications may be provisioned on a single PDM card, only the IMPP, SIP, and presence protocol PDI functions 514, 512, and 516, respectively, are described herein. SIP PDI function 512 essentially contains the logic necessary to process incoming SIP presence messages and construct outgoing SIP presence response messages. Similarly, IMPP PDI function 514 contains the logic necessary to process incoming IMPP formatted presence messages and construct outgoing IMPP formatted presence response messages. Presence PDI function 516 contains the logic necessary to process incoming presence query messages formatted according to the presence protocol and construct outgoing presence response messages formatted according to the presence protocol.

In one embodiment, a presence server and database system may be externally and directly connected to a network node. A presence server including a presence database may be directly connected to the network node for receiving and storing presence information about a presentity obtained from signaling message communications on the network node. Further, the presence server and database may be accessed for obtaining presence information in response to presence queries. The network node may also access the presence server and database for presence registrations. The network node and presence server and database system may be connected via Ethernet or any other suitable communication connection.

Figure 6:
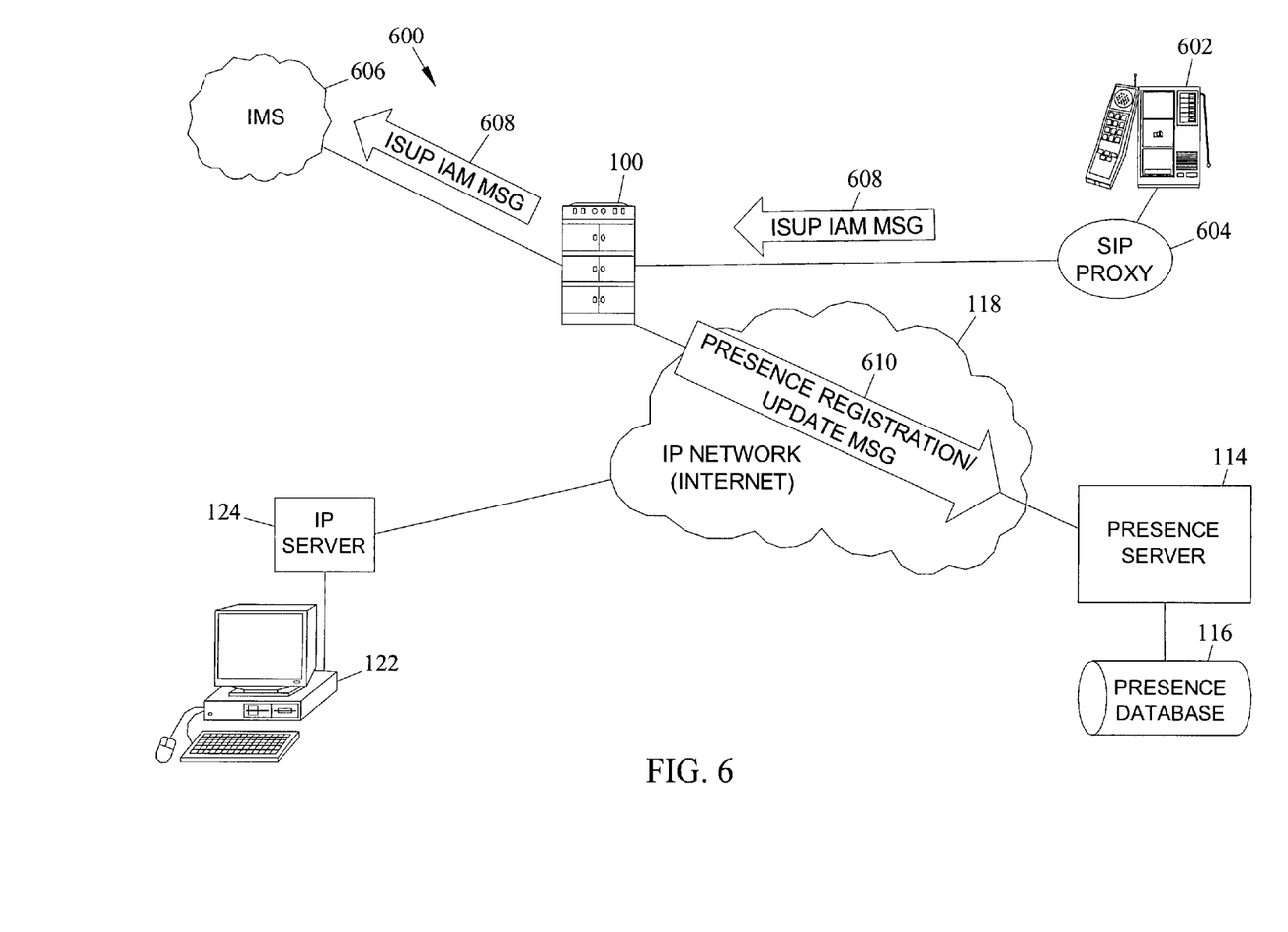
FIG. 6 is a block diagram of an example of a telecommunications system for using a presence database to deliver enhanced presence information regarding communications made to or from a presentity based on information in a SIP message according to an embodiment of the subject matter described herein.

Shown in FIG. 6 is a variation of the scenario illustrated in FIG. 1 where a signaling message including enhanced presence information regarding parties involved in communications made to or from a presentity is comprised of an IP-type message instead of an ISUP-type message. FIG. 6 illustrates an implementation of network node 100 in a wired telecommunications environment, generally indicated by the reference numeral 600. Network 600 includes a SIP phone 602, a SIP proxy server 604, and an IMS network 606. In the particular embodiment shown in FIG. 6, it is assumed that a presentity operating SIP phone 602 indirectly initiates a SIP invite message 608 by dialing a phone number of another party. Those skilled in the art of SIP telecommunication networks will appreciate that generation of such SIP messages is accomplished by a SIP proxy server in response to dialing of a phone number, as generally indicated by FIG. 6. As such, by dialing a phone number, the presentity operating SIP phone 602 is effectively manually registering their presence with presence server 114 and presence database 116 via the generation of SIP invite message 608, which in turn causes the generation of a presence registration/update message 610 by node 100. Message 610 may include a calling party identifier associated with SIP phone 602 and an identifier associated with the called party. The identifiers may be stored in presence database 116 for access by authorized subscribers.

The subject matter described herein may be implemented in a signaling transfer point (STP), a SIP/SS7 gateway, a SIP server, an IP multimedia subsystem (IMS) node, or any other suitable network node. Any of these nodes may be operable to use a presence database to deliver information regarding communications made to or from a presentity in a manner similar to the techniques described herein. A node may obtain enhanced presence information regarding parties involved in communications made to or from a presentity and store the information in a presence database that is resident on the node, locally connected to the node, or remote from the node. A subscription request may be received from a subscriber for subscribing to the presentity. In response to the subscription request, enhanced presence information may be delivered from the presence database to the subscriber.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for using a presence database to deliver enhanced presence information regarding communications made to or from a presentity, the method comprising:
    (a) obtaining, from a presence server, enhanced presence information including information regarding parties involved in communications made to or from a presentity and storing the information in a presence database accessible via the presence server, wherein the enhanced presence information includes at least one of information identifying a party with whom the presentity has or is communicating, information regarding a duration of a call with a party with whom the presentity has or is communicating, information regarding re-direction of a call involving the presentity, and information regarding forwarding of a call involving the presentity;
    (b) receiving, at the presence server, a request from a third-party subscriber for obtaining the enhanced presence information regarding the presentity, wherein the third-party subscriber is currently not involved in communications with the presentity; and
    (c) in response to the request, delivering, via the presence server, the enhanced presence information from the presence database to the third-party subscriber, wherein delivering the enhanced presence information to the third-party subscriber includes delivering the enhanced presence information to a terminal associated with the third-party subscriber to provide the third-party subscriber with information regarding the party with whom the presentity has or is communicating.

2. The method of claim 1 wherein obtaining the enhanced presence information includes deriving the enhanced presence information from signaling messages regarding a call involving the presentity.

3. The method of claim 2 wherein deriving the enhanced presence information from signaling messages includes deriving the enhanced presence information from one or more of a signaling system 7 (SS7) signaling message and a session initiation protocol (SIP) signaling message.

4. The method of claim 1 wherein receiving a request from the subscriber includes receiving a subscription request from the subscriber for subscribing to the presentity.

5. The method of claim 1 wherein receiving a request from the subscriber includes receiving a query from the subscriber for the enhanced presence information.

6. The method of claim 1 comprising automatically communicating updates regarding the enhanced presence information to the subscriber in response to changes in the enhanced presence information.

7. The method of claim 1 wherein the enhanced presence information includes a log of calls involving the presentity.

8. The method of claim 7 wherein the log includes identifiers of parties communicating with the presentity.

9. The method of claim 1 wherein steps (a)-(c) are implemented in real-time.

10. A method for using a presence database to deliver enhanced presence information regarding communications made to or from a presentity, the method comprising:
- (a) storing, in a presence database accessible via a presence server, enhanced presence information including information regarding parties involved in communications made to or from a presentity, wherein the enhanced presence information includes at least one of information identifying a party with whom the presentity has or is communicating, information regarding a duration of a call with a party with whom the presentity has or is communicating, information regarding re-direction of a call involving the presentity, and information regarding forwarding of a call involving the presentity;
- (b) receiving, at the presence server, a request from a third-party subscriber for obtaining the enhanced presence information regarding the presentity, wherein the third-party subscriber is currently not involved in communications with the presentity; and
- (c) delivering, via the presence server, the enhanced presence information from the presence database to the third-party subscriber in response to the request, wherein delivering the enhanced presence information to the third-party subscriber includes delivering the enhanced presence information to a terminal associated with the third-party subscriber to provide the third-party subscriber with information regarding the party with whom the presentity has or is communicating.

11. The method of claim 10 wherein storing the enhanced presence information includes storing a log of calls involving the presentity.

12. The method of claim 11 wherein storing the log includes storing identifiers of parties communicating with the presentity.

13. The method of claim 10 comprising deriving the enhanced presence information from signaling messages regarding a call involving the presentity.

14. The method of claim 13 wherein deriving the enhanced presence information from signaling messages includes deriving the enhanced presence information from one or more of an signaling system 7 (SS7) signaling message and a session initiation protocol (SIP) signaling message.

15. The method of claim 10 comprising automatically communicating updates regarding the enhanced presence information to the subscriber in response to changes in the enhanced presence information.

16. The method of claim 10 wherein steps (a)-(c) are implemented in real-time.

17. The method of claim 10 wherein receiving a request from the subscriber includes receiving a subscription request from the subscriber for subscribing to the presentity.

18. The method of claim 10 where receiving a request from the subscriber includes receiving a query from the subscriber for the enhanced presence information.

19. A system for using a presence database to deliver enhanced presence information regarding communications made to or from a presentity, the system comprising:
- (a) a network node configured to obtain enhanced presence information regarding parties involved in communications made to or from a presentity, and configured to store the enhanced presence information in a presence database, wherein the enhanced presence information includes at least one of information identifying a party with whom the presentity has or is communicating, information regarding a duration of a call with a party with whom the presentity has or is communicating, information regarding re-direction of a call involving the presentity, and information regarding forwarding of a call involving the presentity; and
- (b) a presence server configured to receive a request from a third-party subscriber for obtaining the enhanced presence information regarding the presentity and configured to deliver the enhanced presence information from the presence database to a terminal associated with the third-party subscriber in response to the request in order to provide the third-party subscriber with information regarding the party with whom the presentity has or is communicating, wherein the third-party subscriber is currently not involved in communications with the presentity.

20. The system of claim 19 wherein the network node is configured to derive the enhanced presence information from signaling messages regarding a call involving the presentity.

21. The system of claim 19 wherein the network node is configured to derive the enhanced presence information from one or more of a signaling system 7 (SS7) signaling message and a session initiation protocol (SIP) signaling message.

22. The system of claim 19 wherein the network node comprises a device selected from the group consisting of an SS7/ Internet protocol (IP) routing node, a signaling transfer point (STP), a SIP / SS7 gateway, a SIP server, and an IP multimedia subsystem (IMS) node.

23. The system of claim 19 wherein the presence server is configured to automatically communicating updates regarding the enhanced presence information to the subscriber in response to changes in the enhanced presence information.

24. The system of claim 19 wherein the presence database is configured to store a log of calls involving the presentity.

25. The system of claim 19 wherein the presence database is configured to store identifiers of parties communicating with the presentity.

26. The system of claim 19 wherein the presence server is configured to receive a subscription request from the subscriber for subscribing to the presentity and to deliver the enhanced presence information to the subscriber during the subscription.

27. The system of claim 19 wherein the presence server is configured to receive a query from the subscriber for obtaining the enhanced presence information regarding the presentity and to deliver the enhanced presence information regarding the presentity to the subscriber in response to the query.

28. A system for using a presence database to deliver information regarding communications made to or from a presentity, the system comprising:
- (a) a presence database configured to store enhanced presence information regarding parties involved in communications made to or from a presentity, wherein the enhanced presence information includes at least one of information identifying a party with whom the presentity has or is communicating, information regarding a duration of a call with a party with whom the presentity has or is communicating, information regarding re-direction of a call involving the presentity, and information regarding forwarding of a call involving the presentity; and
- (b) a presence server function configured to receive a request from a third-party subscriber for obtaining the enhanced presence information regarding the presentity and configured to deliver the enhanced presence information from the presence database to a terminal associated with the third-party subscriber in response to the request in order to provide the third-party subscriber with information regarding the party with whom the presentity has or is communicating, wherein the third-party subscriber is currently not involved in communications with the presentity.

29. The system of claim 28 wherein the presence database is configured to store a log of calls involving the presentity.

30. The system of claim 29 wherein the log includes store identifiers of parties communicating with the presentity.

31. The system of claim 28 comprising a network node configured to derive the enhanced presence information from signaling messages regarding a call involving the presentity.

32. The system of claim 31 wherein the network node comprises a device selected from the group consisting of an SS7/Internet protocol (IP) routing node, a signaling transfer point (STP), a SIP/SS7 gateway, a SIP server, and an IP multimedia subsystem (IMS) node.

33. The system of claim 28 wherein the network node is configured to derive the enhanced presence information from at least one of a signaling system 7 (SS7) signaling message and a session initiation protocol (SIP) signaling message.

34. The system of claim 28 wherein the presence server function is configured to automatically communicate updates regarding the enhanced presence information to the subscriber in response to changes in the information.

35. The system of claim 28 wherein the presence server function is adapted to receive a subscription request from the subscriber for subscribing to the presentity and to deliver the enhanced presence information from the presence database to the subscriber in response to the subscription request.

36. The system of claim 28 wherein the presence server function is adapted to receive a query for obtaining the enhanced presence information regarding the presentity and to deliver the enhanced presence information from the presence database to the subscriber in response to the query.

37. A computer program product comprising computer executable instructions embodied in a computer readable medium for performing steps comprising:
  (a) obtaining, from a presence server, enhanced presence information including information regarding parties involved in communications made to or from a presentity and storing the information in a presence database accessible via a presence server, wherein the enhanced presence information includes at least one of information identifying a party with whom the presentity has or is communicating, information regarding a duration of a call with a party with whom the presentity has or is communicating, information regarding re-direction of a call involving the presentity, and information regarding forwarding of a call involving the presentity;
  (b) receiving, at the presence server, a request from a third-party subscriber for obtaining the enhanced presence information regarding the presentity, wherein the third-party subscriber is currently not involved in communications with the presentity; and
  (c) in response to the request, delivering, via the presence server, the enhanced presence information from the presence database to the third-party subscriber, wherein delivering the enhanced presence information to the third-party subscriber includes delivering the enhanced presence information to a terminal associated with the third-party subscriber to provide the third-party subscriber with information regarding the party with whom the presentity has or is communicating.

38. The computer program product of claim 37 wherein obtaining the enhanced presence information includes deriving the enhanced presence information from signaling messages regarding a call involving the presentity.

39. The computer program product of claim 38 wherein deriving the enhanced presence information from signaling messages includes deriving the enhanced presence information from one or more of a signaling system 7 (SS7) signaling message and a session initiation protocol (SIP) signaling message.

40. The computer program product of claim 37 wherein receiving a request from the subscriber includes receiving a subscription request from the subscriber for subscribing to the presentity.

41. The computer program product of claim 37 wherein receiving a request from the subscriber includes receiving a query from the subscriber for the enhanced presence information.

42. The computer program product of claim 37 comprising automatically communicating updates regarding the enhanced presence information to the subscriber in response to changes in the enhanced presence information.

43. The computer program product of claim 37 wherein the enhanced presence information includes a log of calls involving the presentity.

44. The computer program product of claim 37 wherein the log includes identifiers of parties communicating with the presentity.

45. The method of claim 37 wherein steps (a)-(c) are implemented in real-time.

46. A computer program product comprising computer executable instructions embodied in a computer readable medium for performing steps comprising:
  (a) storing, in a presence database accessible via a presence server, enhanced presence information including information regarding parties involved in communications made to or from a presentity, wherein the enhanced presence information includes at least one of information identifying a party with whom the presentity has or is communicating, information regarding a duration of a call with a party with whom the presentity has or is communicating, information regarding re-direction of a call involving the presentity, and information regarding forwarding of a call involving the presentity;
  (b) receiving, at the presence server, a request from a third-party subscriber for obtaining the enhanced presence information regarding the presentity, wherein the third-party subscriber is currently not involved in communications with the presentity; and
  (c) delivering, via the presence server, the enhanced presence information from the presence database to the third-party subscriber in response to the request, wherein delivering the enhanced presence information to the third-party subscriber includes delivering the enhanced presence information to a terminal associated with the third-party subscriber to provide the third-party subscriber with information regarding the party with whom the presentity has or is communicating.

47. The computer program product of claim 46 wherein storing the enhanced presence information includes storing a log of calls involving the presentity.

48. The computer program product of claim 47 wherein storing the log includes storing identifiers of parties communicating with the presentity.

49. The computer program product of claim 46 comprising deriving the enhanced presence information from signaling messages regarding a call involving the presentity.

50. The computer program product of claim 49 wherein deriving the enhanced presence information from signaling messages includes deriving the enhanced presence information from one or more of a signaling system 7 (SS7) signaling message and a session initiation protocol (SIP) signaling message.

51. The computer program product of claim 46 comprising automatically communicating updates regarding the enhanced presence information to the subscriber in response to changes in the enhanced presence information.

52. The computer program product of claim 46 wherein steps (a)-(c) are implemented in real-time.

53. The computer program product of claim 46 wherein receiving a request from the subscriber includes receiving a subscription request from the subscriber for subscribing to the presentity.

54. The computer program product of claim 46 wherein receiving a request from the subscriber includes receiving a query from the subscriber for the enhanced presence information.

* * * * *